(12) United States Patent
Manoogian

(10) Patent No.: US 6,179,119 B1
(45) Date of Patent: Jan. 30, 2001

(54) COMPACT DISC HOLDER WITH ARTWORK DISPLAY SYSTEM

(76) Inventor: Brian C. Manoogian, 50 Scenic Oaks Dr., Bloomfield Hills, MI (US) 48304

( * ) Notice: Under 35 U.S.C. 154(b), the term of this patent shall be extended for 0 days.

(21) Appl. No.: 09/290,859

(22) Filed: Apr. 14, 1999

(51) Int. Cl.[7] .................................................. B65B 85/57
(52) U.S. Cl. ..................... 206/308.1; 206/309; 206/232
(58) Field of Search .................. 206/308.1, 309–313, 206/232, 493, 459.5, 767; 40/748, 750–756, 759–761; 248/205.3

(56) References Cited

U.S. PATENT DOCUMENTS

| | | | |
|---|---|---|---|
| 4,832,301 | * | 5/1989 | Hiramoto et al. ................. 248/205.3 |
| 5,284,243 | * | 2/1994 | Gelardi et al. .................... 206/308.1 |
| 5,328,137 | * | 7/1994 | Miller et al. ...................... 248/205.3 |
| 5,351,425 | * | 10/1994 | Knappe et al. .......................... 40/751 |
| 5,542,634 | * | 8/1996 | Pomerantz ........................ 248/205.3 |
| 5,613,612 | * | 3/1997 | Davault .............................. 206/308.1 |
| 5,738,221 |   | 4/1998 | Van Witt et al. . |
| 5,769,227 | * | 6/1998 | Fantone ................................ 206/232 |
| 5,782,347 | * | 7/1998 | Fantone et al. ....................... 206/232 |
| 5,850,913 |   | 12/1998 | Fantone et al. . |

OTHER PUBLICATIONS

Marketing Literature from Eastern Kodak Company entitled *Kodak Dynamic Imaging* © Eastman Kodak Company, 1996.

* cited by examiner

*Primary Examiner*—Luan K. Bui
(74) *Attorney, Agent, or Firm*—Harness, Dickey & Pierce, PLC

(57) ABSTRACT

A container for holding storage media is provided which contains an image carrying member, an upper and lower case member and a storage media holding member. Display flanges are provided for displaying the mage carrying is removed from the container.

8 Claims, 4 Drawing Sheets

COMPACT DISC HOLDER WITH ARTWORK DISPLAY SYSTEM

BACKGROUND AND SUMMARY OF THE INVENTION

This invention relates generally to flat storage and display boxes and, more particularly to an optical arrangement for providing enhanced viewing of textual, graphic, and/or other symbolically coded information located on the inside of flat, transparent storage and display boxes for compact discs, audio tapes or the like.

Compact discs, which were first developed by Phillips and Sony in the early 1980's, are now a well established form of medium for recording a variety of retrievable information. Their popularity and success stem from their compactness, convenience, competitive cost, and information storing capacity.

Such thin, flat, circular objects are stored in flat containers referred to as "jewel" boxes. Such boxes are generally made of durable, transparent plastic such as polycarbonate or styrene and have been designed to occupy a minimal amount of space consistent with their protective function. The current technique for informing CD users about the contents of recorded CD information is to provide the information in the form of a thin paper booklet or sheet that is visible through the flat, transparent panel of the jewel boxes front cover or base, or both. In addition, uses also made of the edge of the box for display information about the title and author or artist of the CD. Many forms of CD case artwork have been incorporated into CD cases. For example, U.S. Pat. No. 5,738,221 shows the display of a "pop-up" display within the case.

The limited exterior surface of the conventional CD box, limits the amount of information that can be seen through any one surface thus requiring relevant information to be distributed among available surfaces. This forces a respective buyer to flip through stacks of CDs while scanning the front covers in search of the identity of a particular CD, usually by title and/or artist, and may be of interest and then turning the box around to examine the rear surface for information about the detailed contents.

U.S. Pat. No. 5,850,913 entitled "Compliant Image Carrying Printed Insert", issued on Dec. 22, 1998 discloses the use of horizontally and vertically oriented lenticulated panels in combination with interlaced images to convey different views by physically manipulating the angle of observance of the box. The lenticulated panels are formed into the outer covers of the display box and focus on an interlaced image in the thin paper booklet or CD below.

While optical approaches have been used in the past for using parallax effects to increase the amount of visible information within a jewel box, these systems require the molding of complex shapes into the CD case as well as precise positioning of the paper or booklet insert.

As the artwork provided in CD cases becomes more sophisticated, collectors and appreciators of album cover artwork are need of a simple mechanism for display the artwork shown in the paper booklets or sheets. Hence, there is a need for a solution to the foregoing problems, and it is a primary object of this invention to provide a solution through the use of optical arrangements which enhance the viewing opportunities and amount of information that can be visually detected by a perspective CD owner.

In view of the known art, there continues to be a demonstrable need for more efficient ways to provide significantly improved visual access to flat containers and display boxes for the purpose of informing perspective users about the contents of the containers. Further, there continues to be a need for improved ways to improve the attractiveness and facilitate the display of the album cover artwork and therefore induced increased sales of these products. It is a primary objective of this invention to fulfill this need.

Yet another object of the present invention is to provide flange or stand means within the jewel box for attachment to the CD artwork to provide an easy means for displaying the artwork.

Other benefits of the invention will be apparent and will appear hereinafter in the following detailed description when read with the appended drawings.

BRIEF DESCRIPTION OF THE DRAWINGS

In the drawings where like reference numerals are used to indicate identical components in the various figures.

DETAILED DESCRIPTION OF THE PREFERRED EMBODIMENTS

Figure 1:
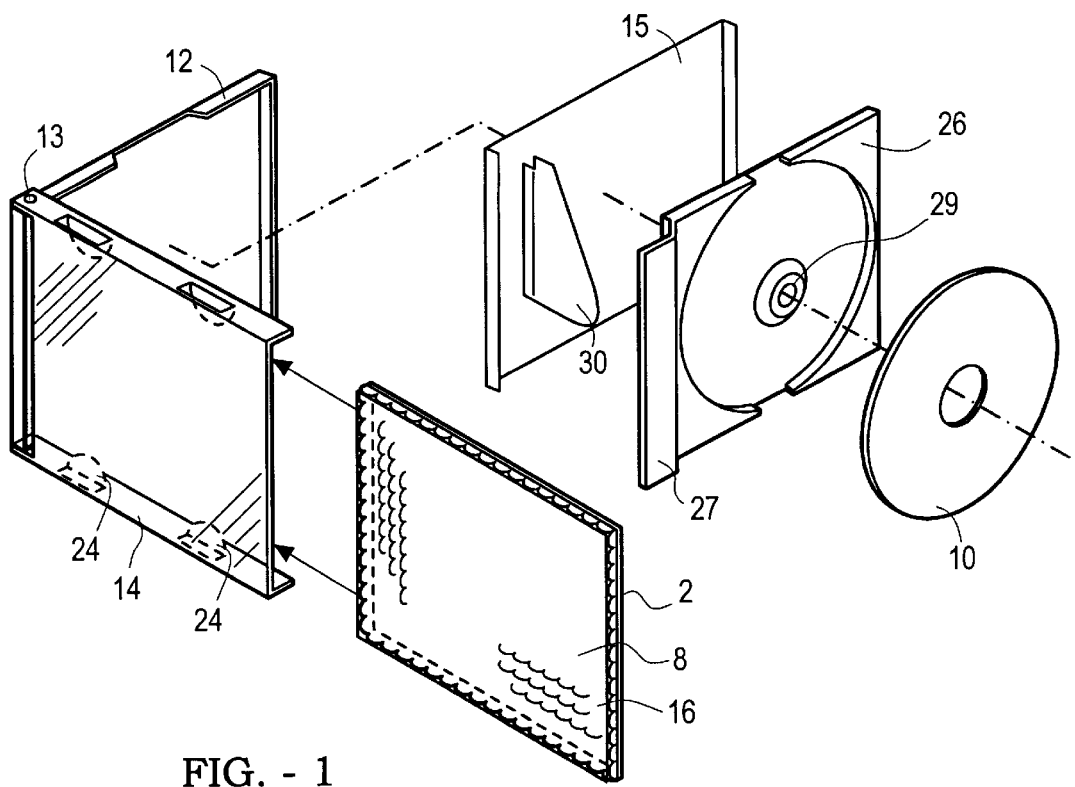
FIG. 1 is a perspective view of the preferred embodiment.

Depicted in FIG. 1 is a exploded view of the CD case of the referred embodiment. The CD case is shown having a CD artwork arrying member 16, an upper case member 14, a lower case member 12 and a storage media holding member 26. The upper case member 24 has a plurality of flanges 24 for holding the CD artwork carrying member 16 within the CD case. The upper and lower case members are joined by a hinge 13 disposed therebetween. Disposed within the case, the storage media holding member 26 has an outer flange 27, display flange 30 and a mounting portion 29 for mounting a CD 10.

Figure 3:
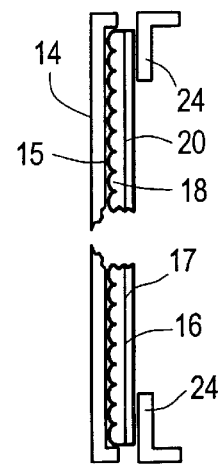
FIG. 3 is a cross-sectional view of an embodiment of the current invention.
Figure 6:
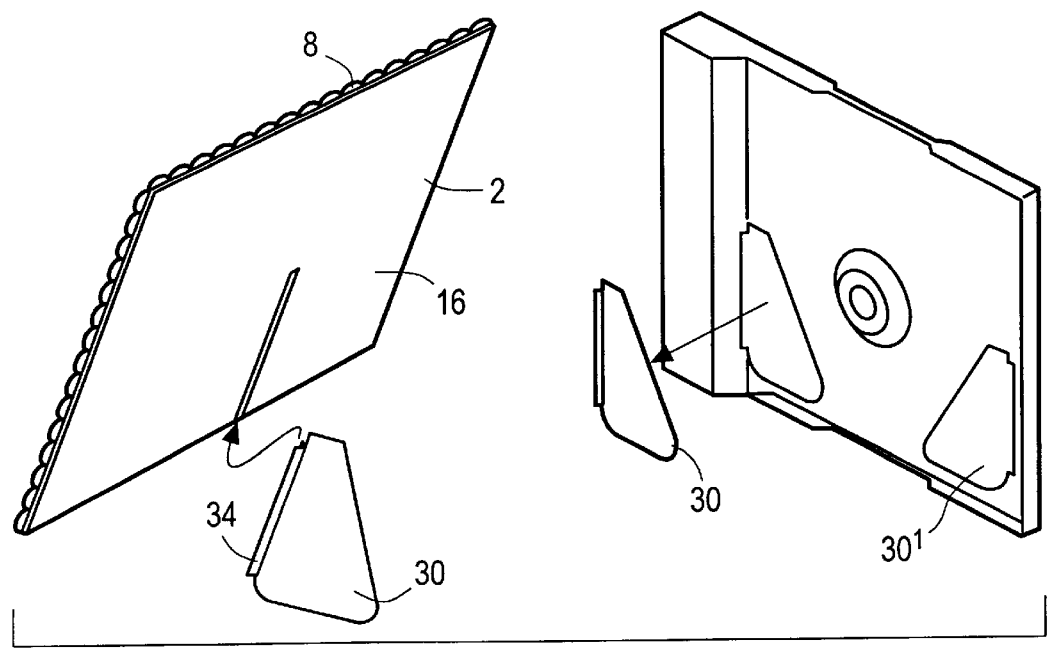
FIG. 6 shows the storage of the display flanged members within the multi CD holding case.

As seen in FIGS. 1, 3, and 6, the CD artwork holder has a forward surface 8 and a ridgidized backing layer 2. The artwork on the surface can be pictorial, holographic, pop-up, a dynamic image, or any other type of artistic rendering.

Figure 2:
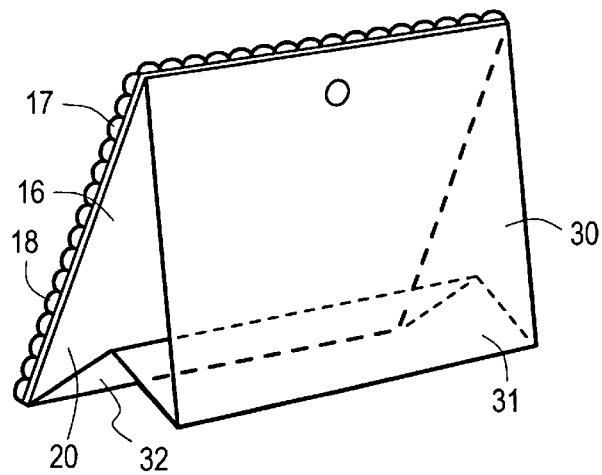
FIG. 2 is a view of a CD artwork carrying member of the current invention.

Shown in FIG. 2, when the artwork carrying member 16 carries a dynamic image, the dynamic image carrying member 17 has a forward lens portion 18 and a rearward image holding portion 20. Flange member 30 is shown disposed on the image carrying portion 20. Optionally, this flange 30 can be further attached to the image holding member 20 by a plurality of members 31, 32.

FIG. 3 shows a cross-sectional view of the upper case member 14 holding a dynamic image carrying member 17. The CD artwork carrying member 16 is held in the upper case member 14 by the plurality of flanges 24. As shown, the forward surface 18 of the CD artwork carrying member 16 is adjacent to the intersurface 15 of the upper case member 14. The image carrying member 20 is held adjacent to the plurality of flanges 24.

Figure 4A:
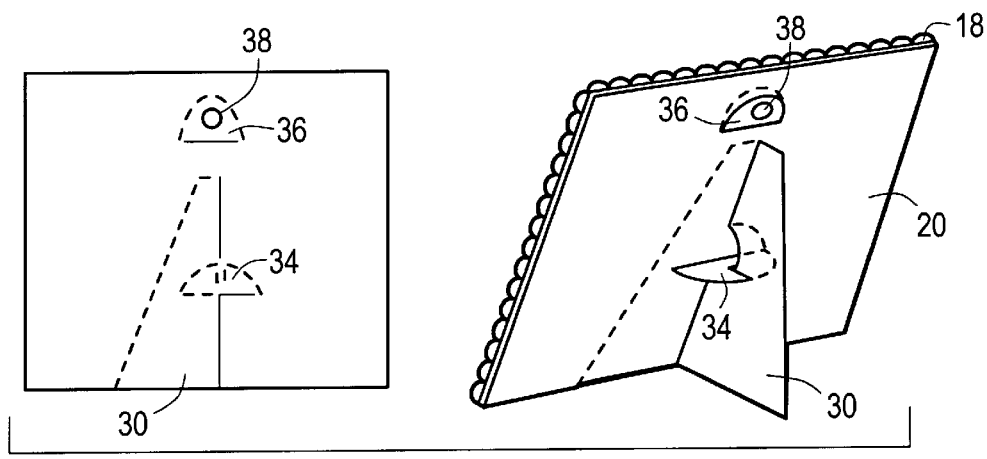
FIGS. 4a–c represent alternative display means for the CD artwork carrying member.
Figure 4B:
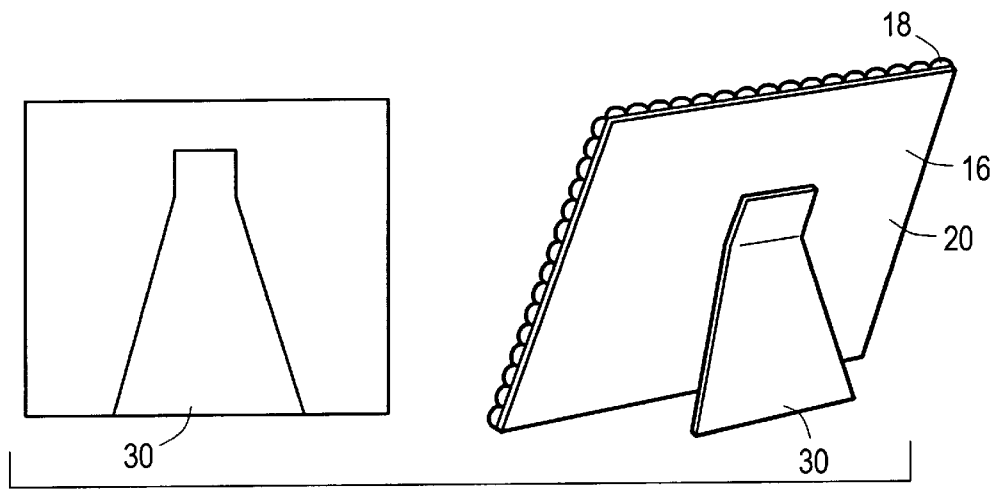
Figure 4C:
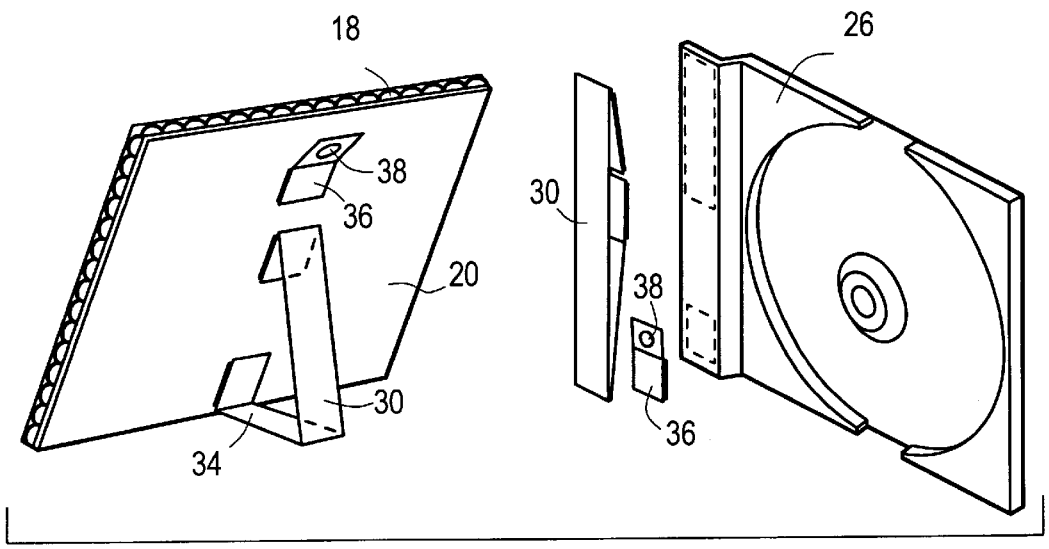

FIGS. 4a–c depict various optional display flanges. FIG. 4a depicts a second display flange 36 having a hole 38 for mounting a dynamic image carrying member 17 onto a wall. FIG. 4c displays optional display flanges mounted to the media carrying member 26. It should be noted, that the flanges in FIG. 4c are shown to be joined to the dynamic image carrying member 17 by use of adhesive. As known in the art, many equivalents and fastening options are possible including adhesive layers, staples, toy tabs and screws.

Figure 5:
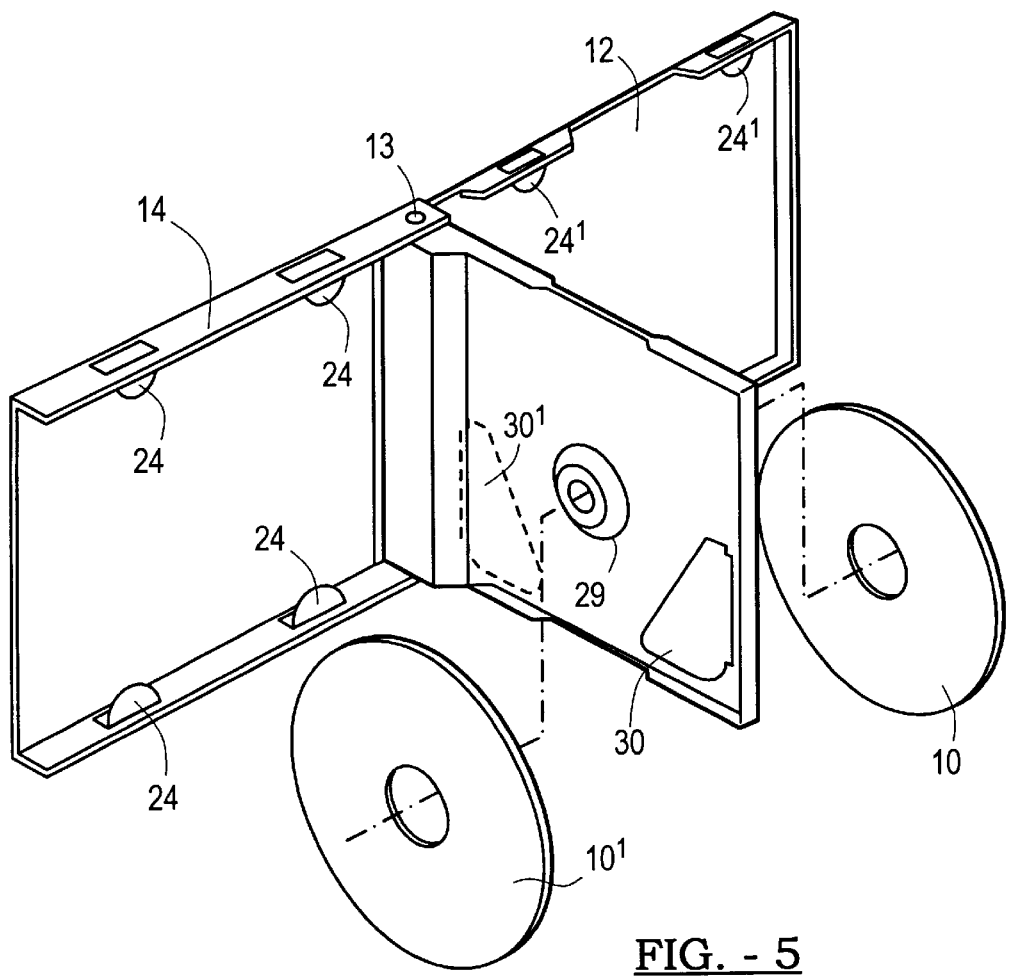
FIG. 5 is a perspective view of a multi CD holding case.

FIG. 5 depicts a CD case modified to hold a pair of CD's 10, 10' depicted, is the upper case member 14, lower case member 12 and media holding member 26 connected by hinge 13. Shown are mounting flange members 30, 30' disposed on the storage media holding member 26. As shown in FIG. 5, these mounting flange members can be removed from the media storage member and disposed onto the back surface 2 of the CD artwork carrying member 16.

Figure 7A:
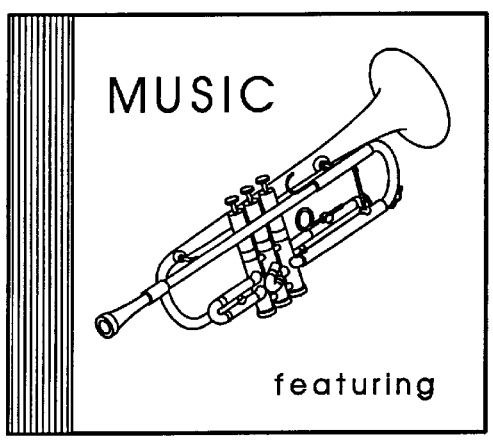
FIGS. 7a and 7b depict uses of the current invention.
Figure 7B:
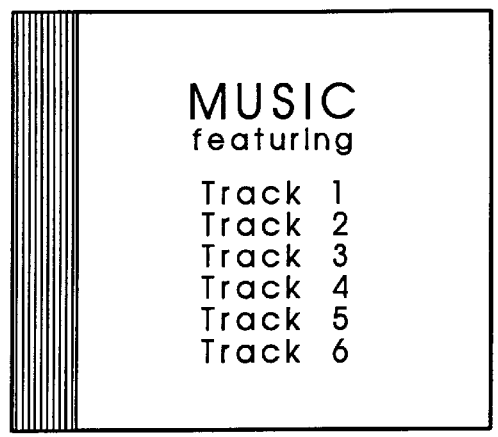

A dynamic image carrying member 17 can present different observable messages or depict the illusion of a moving object. As depicted in FIGS. 7a and 7b, graphic artwork of any type as well as a description of the musical features within the CD are possible.

Figure 8:
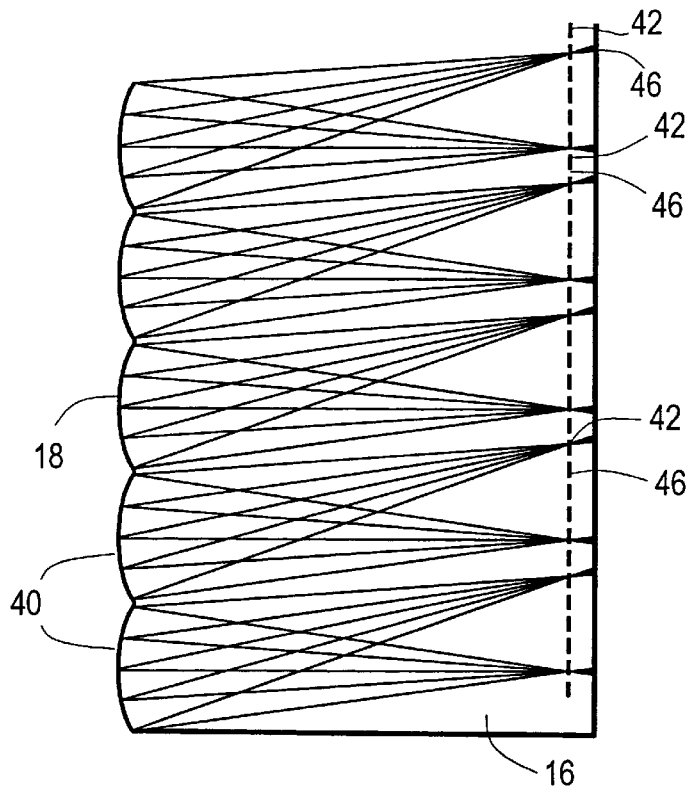
FIG. 8 is a diagrammatic plan view illustrating the principle of and operation of the lenticulated surfaces of the invention.
Figure 9:
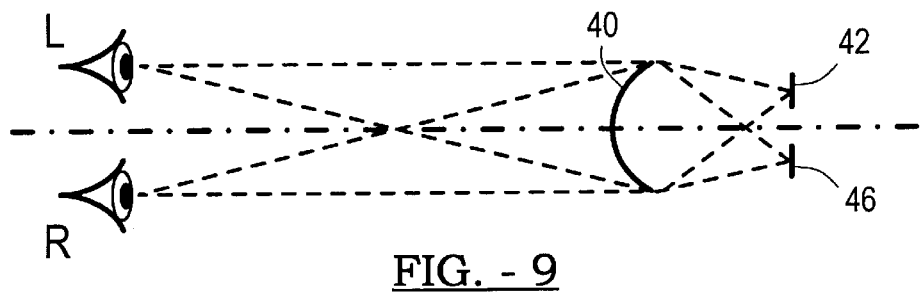
FIG. 9 is a diagram of the lenticulated panels tracing the paths various light rays take in traveling to different segments of interlaced images formed within the dynamic image holding member.

FIG. 8 depicts a cross-section of a dynamic image carrying member 16. The front surface 18 has a plurality of lenses 40 to project the images stored on the rearward image holding portion 20. FIG. 8 shows a pair of images stored in the rearward image holding portion 20 along lines 42 and 46. As better depicted in FIG. 9, light from the rear images is reflected through the lens 40 to the viewer. By changing the observation angle of the dynamic image carrying member 16, another image is reflected toward the observer.

While in the foregoing specification this invention has been described in relation to certain preferred embodiments thereof and many details have been set forth for the purpose of illustration, it will be apparent to those skilled in the art that the invention is susceptible to additional embodiments and that certain of the details described herein can vary considerably without departing from the basic principles of the invention.

What is claimed is:

1. A container for holding storage media comprising:
   a dynamic image carrying member;
   an upper case member having a plurality of dynamic image carrying member holding flanges for holding the dynamic image carrying member;
   a lower case member being coupled to the upper case member by a hinge;
   a flange member disposed within the container which is coupled to the dynamic image carrying member for supporting the dynamic image carrying member when the dynamic image carrying member is removed from the container.

2. The container of claim 1 wherein the flange member is hingably coupled to the dynamic image carrying member.

3. The container of claim 1 wherein the flange member defines a mounting hole.

4. The container of claim 1 further including a second flange member coupled to the dynamic image carrying member.

5. The container of claim 4 wherein the second flange member is in contact with the first flange member.

6. The container of claim 1 wherein a storage media holding member is coupled to the hinge.

7. The container of claim 6 wherein the storage media holding member is capable of holding a plurality of storage media.

8. The container of claim 1 wherein the lower case member has a plurality of dynamic image carrying members.

* * * * *